(No Model.) 3 Sheets—Sheet 1.
A. H. BROMLEY, Jr.
PHOTOGRAPHIC CAMERA.
No. 593,010. Patented Nov. 2, 1897.
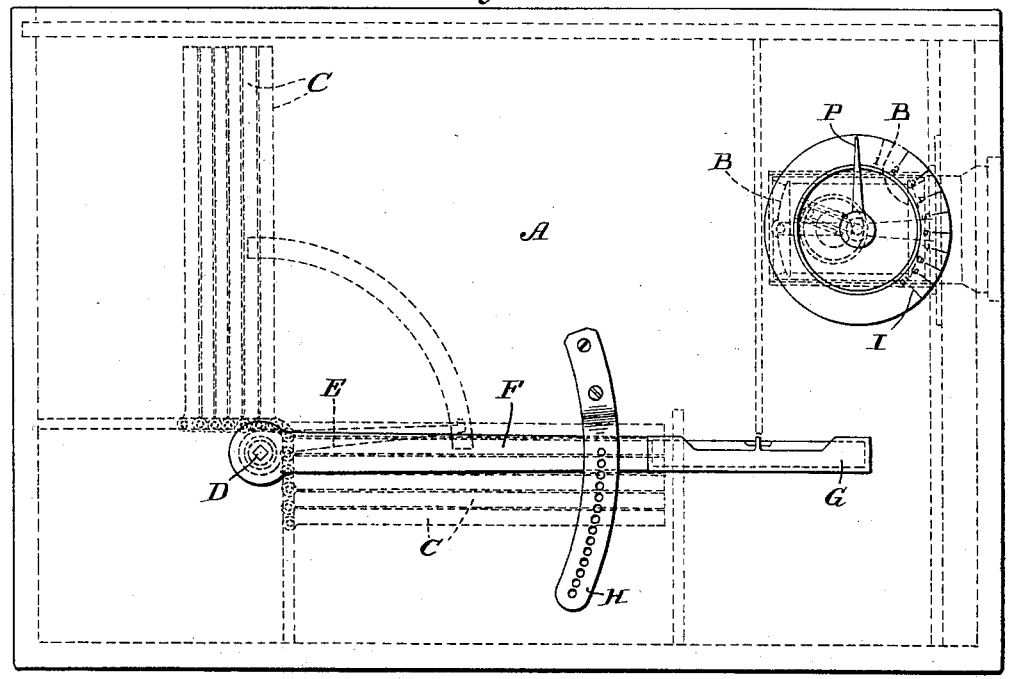
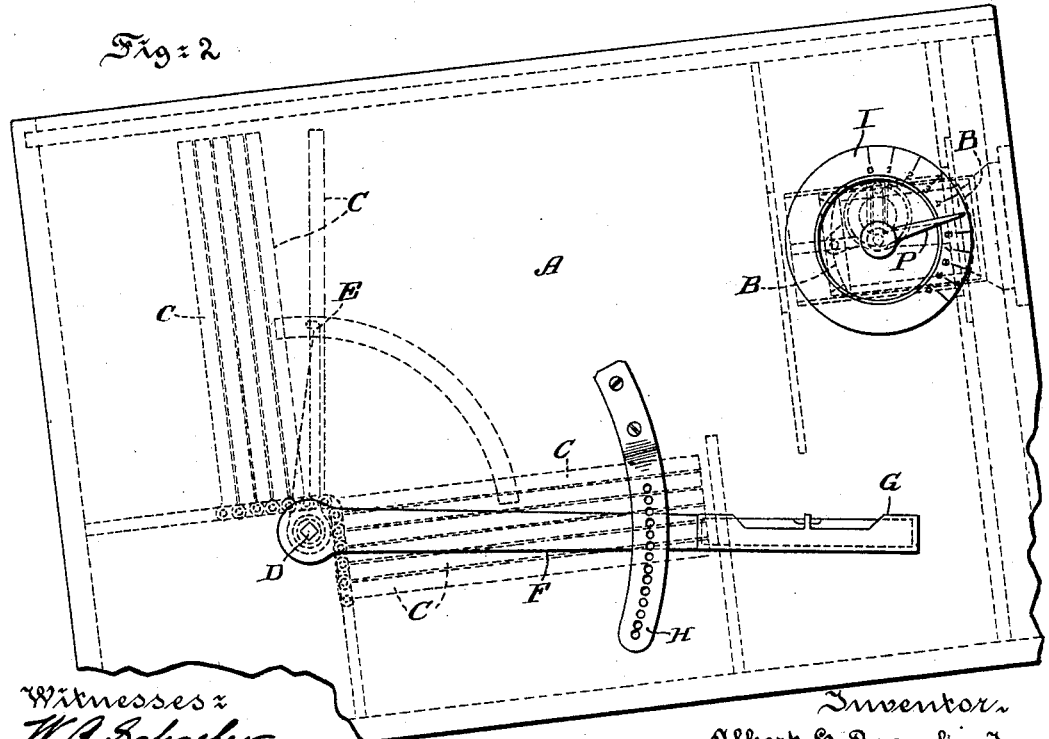
Witnesses:
W. A. Schaefer.
H. Craig Shields
Inventor,
Albert H. Bromley Jr.
By his attorney Chas. A. Rutter.
THE NORRIS PETERS CO., PHOTO-LITHO., WASHINGTON, D. C.

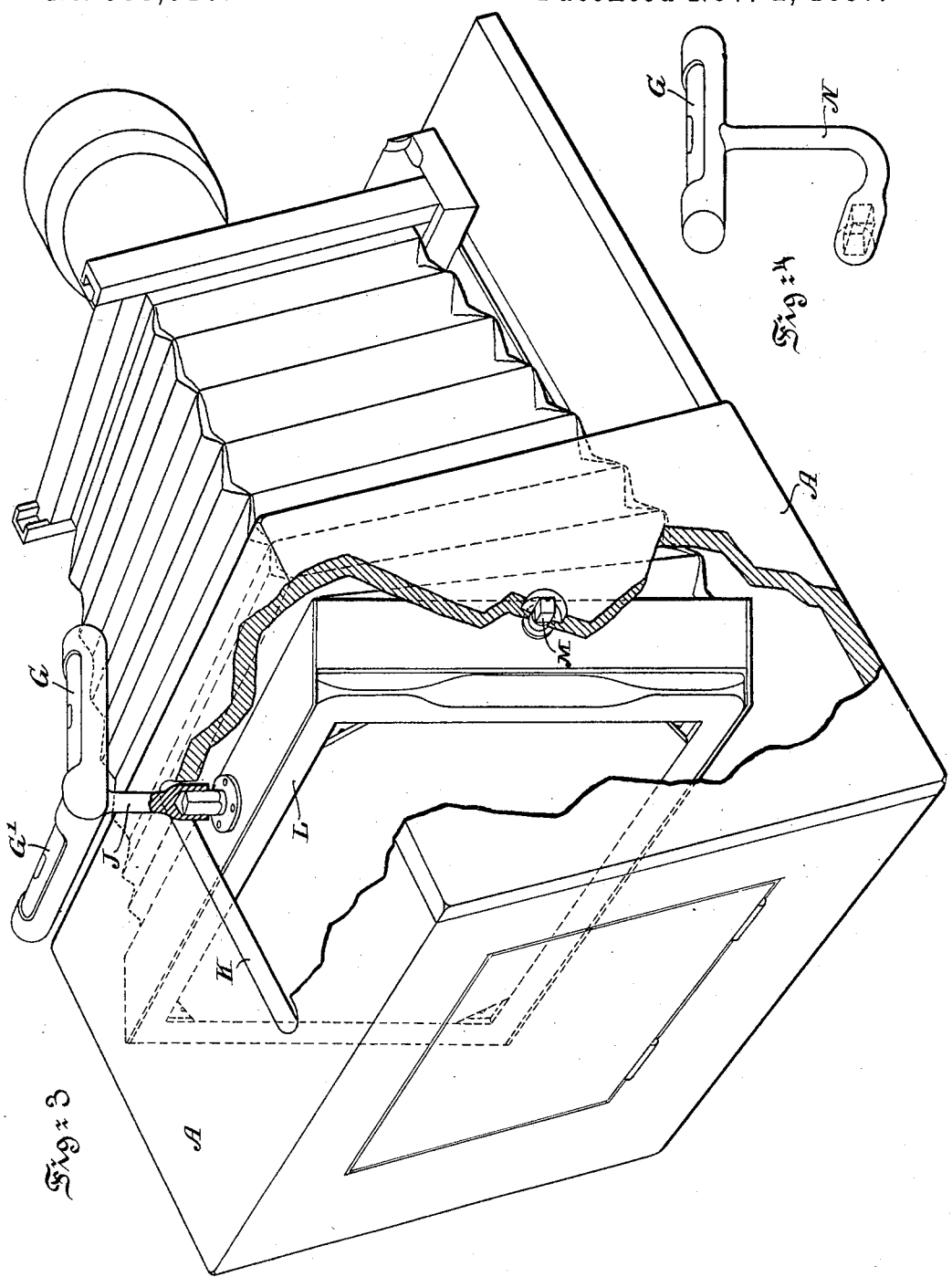

(No Model.) 3 Sheets—Sheet 3.
A. H. BROMLEY, Jr.
PHOTOGRAPHIC CAMERA.
No. 593,010. Patented Nov. 2, 1897.
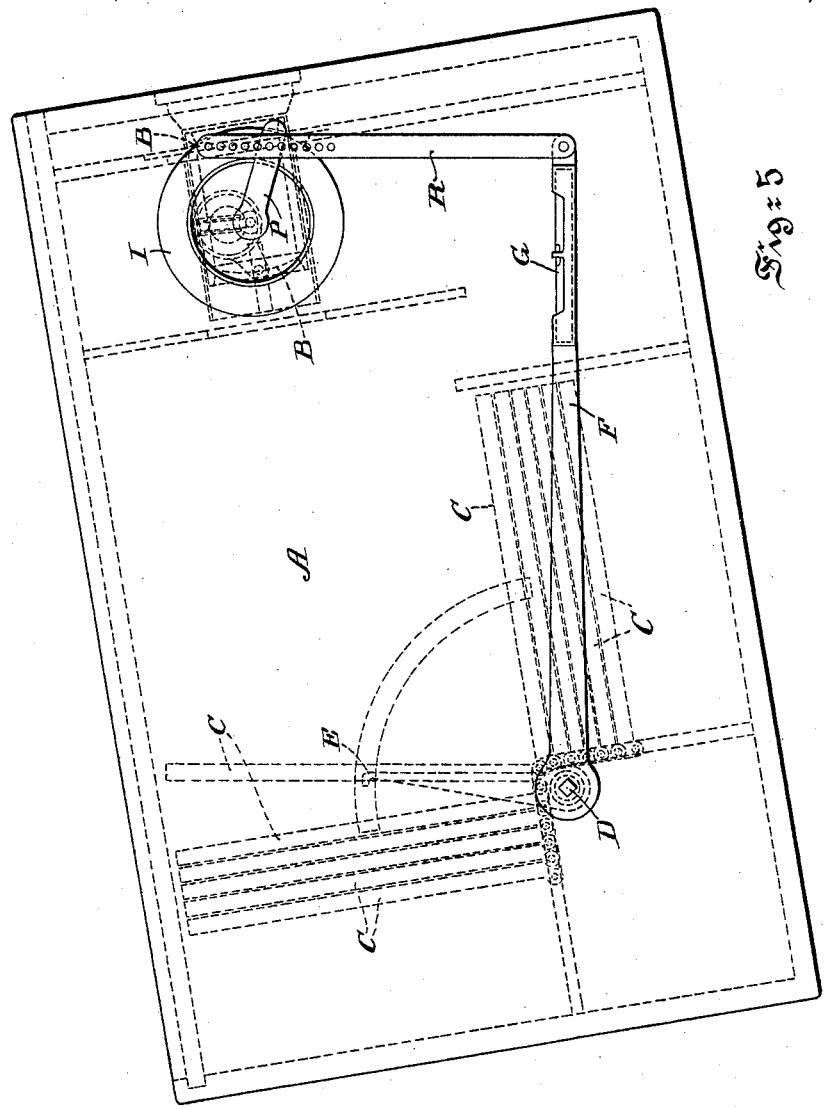
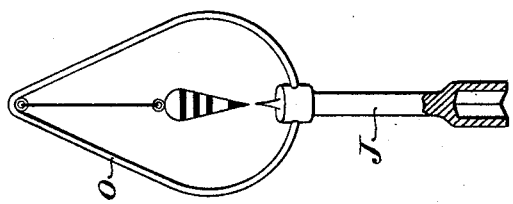
Witnesses
Craig Shields
Geo. K. Nannemacher.
Inventor,
Albert H. Bromley Jr
By his Attorney Chas. A. Rutter.

UNITED STATES PATENT OFFICE.

ALBERT H. BROMLEY, JR., OF PHILADELPHIA, PENNSYLVANIA.

PHOTOGRAPHIC CAMERA.

SPECIFICATION forming part of Letters Patent No. 593,010, dated November 2, 1897.

Application filed October 10, 1896. Serial No. 608,432. (No model.)

*To all whom it may concern:*

Be it known that I, ALBERT H. BROMLEY, Jr., a citizen of the United States, and a resident of the city and county of Philadelphia, State of Pennsylvania, have invented certain new and useful Improvements in Photographic Cameras, of which the following is a specification.

My invention relates in general to improvements in photographic cameras, and more particularly to improvements in that class of cameras the plate-holders or the swing-back of which are inclosed in a box and which are not conveniently or possibly visible when the machine is in use; and the object of my invention is to furnish a device by means of which the sensitive plate or the holder carrying the plate can be positively set in a position perpendicular to the ground before the sensitive plate is exposed. To obtain a correct picture, it is necessary that the plate be perfectly plumb or perpendicular to the ground. If it is not, the vertical lines in the object being photographed—a building, for instance—will appear to converge or diverge in the negative, and consequently the negative will be distorted and will not be a true copy of the subject.

In the accompanying drawings, forming part of this specification and in which similar letters of reference indicate similar parts throughout the several views, Figure 1 is a side elevation of a closed camera fitted with my improvement; Fig. 2, a similar view, the camera being tilted, showing my means for adjusting and showing the position of the plate-holder and the plate at the time of making the exposure; Fig. 3, a perspective view of another form of closed-back camera to which my improvement is attached; Fig. 4, a perspective view of a modified form of leveling device; Fig. 5, a view showing a rod connecting the arm which carries the level and the pointer the turning of which focuses the lens by means of which the lens is automatically focused for different positions of the plate-holder, and Fig. 6 a perspective view of a modified form of device for leveling the instrument and plumbing the plate.

Referring first to Figs. 1 and 2, A is a box which carries the lens B and the plate-holders C. The box A is, when the plate-holders C are filled, entirely closed and its interior invisible. The plate-holders C, of which there are a number, are carried on pivots at their lower ends, and by suitable mechanism can be dropped down one at a time, moving about their pivots very much as the leaves of a book. If this camera is held perfectly horizontally during the exposure of the plates that it carries, which position can be determined by an ordinary hand-level, and if the plate being exposed is left in its normal or perpendicular position, as shown in Fig. 1, its work will be entirely satisfactory; but if it is necessary to tilt the camera so as to get on the plate parts of the view that would not be seen otherwise, it is necessary to furnish some positive means for placing the plate-holder perpendicular in order to obtain satisfactory results. Guesswork is usually resorted to to accomplish this end, but usually with poor results.

In cameras of the class now under consideration a shaft having a shoulder D, adapted to be engaged and turned by a clock-key, projects across and through one of the sides of the box A and is furnished with an arm E, (shown in dotted lines,) which is adapted when the shaft is turned by the key to engage and move down, one at a time, the plate-holders C. To the clock-key or to an arm F, taking its place, I attach a level G, and by means of this level, which is when in use at right angles to the arm E and to the plate-holder which the arm E is engaging and moving, I am able instantly to move the plate-holder into a vertical position, which is shown by the central position of the bubble in the level, as illustrated in Fig. 2.

In instruments of the kind just described the lens is focused by means of a graduated scale previously experimentally adjusted and a pointer or its equivalent connected with said scale and the moving lens of the instrument. This scale is adjusted for the horizontal position of the box A, as shown in Fig. 1. If the plate-holder C is moved, as shown in Fig. 2, it will be seen that it is closer to the lens than in Fig. 1, so the lens has to be refocused for this position. In order to accomplish this refocusing speedily, I place on the side of the box A a graduated arc or plate H, and I furnish the lens with a graduated scale I, and by experiment I set these scales so that the graduations on one will correspond with the graduations on the other. If, now, I have focused my lens by means of the scale for the position of the plate shown in Fig. 1 and I have moved down arm F, as shown in Fig. 2, five points on the scale or plate H, it will be necessary for me to move down the pointer P, connected with the lens, five points on scale I to compensate for the forward movement of the plate-holder C.

Instead of making two operations of plumbing the plate and refocusing the lens to correspond to the changed position of the plate, the arm F, which carries the level G, and the pointer P may be connected by a rod R, Fig. 5, and any movement of the arm F will be by the rod R transmitted to the pointer P, and thence through the intervening mechanism to the lens. The rod R is furnished with perforations or pins adapted to engage pins or perforations carried by pointer P. The pointer P is first moved so as to focus the lens for the plate in its normal position. (Shown in Fig. 1.) The rod R is now, by means of the pins and perforations or any equivalent means, attached to the pointer P, and the arm F is moved until the level G shows the plate to be plumb. The movement of the arm F has caused the pointer P to be moved the proper distance to refocus the lens for the changed position of the plate, and this latter can be now exposed with certainty that it is both plumb and in proper focus.

The proper position for attaching the rod R to the arm F and to the pointer P will be determined by experiment.

The refocusing of the lens by this device may not be exactly perfect for every position of the plate, but it will be near enough for all practical purposes.

In Fig. 3 my leveling attachment is shown applied to a camera furnished with a swing-back. In this case the swing-back is centrally pivoted, and hence no adjustment of the lens is required for its movements, as the center of the plate is always at the same distance from the lens, supposing, of course, that the bellows or the lens have not been moved in or out. As before, A is the box inclosing the swing-back, which carries the plate-holder.

G G' are levels placed at right angles to each other, carried by a stem J, which is attached in any suitable manner to the top of the swing-back and which passes through a slot K in top of box A. The level G is used to place the swing-back in a vertical position and the level G' to place the plate with its upper and lower edges horizontally. It will be seen that the level G may be attached directly to top of swing-back L and observed through slot K in top of box A.

Instead of attaching level G, as above described, to the swing-back it may be attached to one of the pivots upon which the swing-back works. For this purpose the pivot, as M, would be flattened out and continued through the side of the box A, and a clock-key arrangement, as N, Fig. 4, carrying the level G, would be placed on the end of the pivot and the level would show at once when the plate was vertical. In cameras of the class shown in Fig. 3 this latter arrangement would be the preferable one, as very small changes would have to be made to adapt them to this invention.

In Fig. 6 I show a plumb-bob arrangement by means of which both the vertical position of the plate and the horizontal position of its upper and lower edges may be ascertained. In this modification the stem J, which corresponds to the stem J shown in Fig. 3 and which may be attached to the swing-back in the same manner, carries a frame O, from which the plumb is suspended. A suitable mark indicates the center of the upper end of stem J, and when the plumb swings to this mark it indicates that the face of the sensitive plate is perpendicular and that its upper and lower edges are horizontal—in other words, that the plate is in proper position to receive the picture.

Having thus described my invention, I claim as new and desire to secure by Letters Patent—

1. The combination with the swing-back or swinging plate of a closed photographic camera, of an arm carried by and moving with the swing-back or swinging plate-holder and projecting outward through the closed back, and a level carried by said arm, substantially as and for the purposes set forth.

2. The combination in a closed-back camera, of a swing-back or swinging plate-holder, a pivot or shaft upon which or around which said swing-back or plate-holder can turn, a level and means for attaching said level to said pivot and at right angles to said plate-holder or swing-back.

3. The combination in a closed-back photographic camera, of an adjustable lens, plate-holders adapted to be swung backward or forward, means for indicating upon the outside of said camera the position of the plate-holders, and devices connecting said plate-holder and the lens whereby the latter will be automatically focused for the several positions of the plate-holder.

4. The combination in a closed-back photographic camera, of swinging plate-holders, an arm outside the camera adapted to be attached at right angles to and to move with said plate-holder, a level carried by said arm, an adjustable lens, means for moving said lens in or out in order to focus it, a pointer connected with said focusing means, a rod connecting said level-carrying arm and said pointer, and means whereby said arm may be adjustably attached to said pointer.

5. The combination in a closed photographic camera of swinging plate-holders pivoted at their lower ends, a shaft about which said plate-holders may be revolved, an arm or arms within the camera carried by said shaft adapted to engage and move said plateholders around their pivots one at a time, an arm outside said camera attached to said shaft and at right angles to said first arm, a level carried by said latter arm, a graduated scale showing the movement of said latter arm, an adjustable lens, a pointer moving with said lens, and a graduated scale, corresponding to said first scale, along which said pointer sweeps, substantially as and for the purposes set forth.

ALBERT H. BROMLEY, Jr.

Witnesses:
 CHRISTOPHER FALLON,
 CHAS. A. RUTTER.